US011586456B2

(12) United States Patent
Jamkhedkar et al.

(10) Patent No.: US 11,586,456 B2
(45) Date of Patent: Feb. 21, 2023

(54) AGENCY AND REGULATION MODELING FOR TRANSACTIONS IN MULTI-TENANT SYSTEMS

(71) Applicant: PayPal, Inc., San Jose, CA (US)

(72) Inventors: Prashant Jamkhedkar, Fremont, CA (US); Aravindan Ranganathan, San Jose, CA (US); Timothy Ross Coulter, Henderson, NV (US); Sandeep Kumar, Fremont, CA (US); Norihiro Aoki, San Jose, CA (US); Justin White, La Selva, CA (US); Jeffrey David Meyer, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 1090 days.

(21) Appl. No.: 16/236,001

(22) Filed: Dec. 28, 2018

(65) Prior Publication Data

US 2019/0384624 A1    Dec. 19, 2019

Related U.S. Application Data

(63) Continuation-in-part of application No. 16/009,994, filed on Jun. 15, 2018, now Pat. No. 11,030,329.

(51) Int. Cl.
*H04L 9/40* (2022.01)
*G06F 9/455* (2018.01)
(Continued)

(52) U.S. Cl.
CPC ........ *G06F 9/45558* (2013.01); *G06F 9/5055* (2013.01); *G06F 16/1865* (2019.01);
(Continued)

(58) Field of Classification Search
CPC .... H04L 63/0815; H04L 63/20; G06Q 10/067
See application file for complete search history.

(56) References Cited

U.S. PATENT DOCUMENTS

| 7,657,639 B2 | 2/2010 | Hinton |
| 8,271,536 B2 | 9/2012 | Amradkar et al. |

(Continued)

OTHER PUBLICATIONS

Ashwini A., "What are the Pros and Cons of Multi-tenancy In Rails Application?", Retrieved from the Internet: https://medium.com/swlh/what-are-the-pros-and-cons-of-multi-tenancy-in-rails-application-547d0f9c205f, Oct. 3, 2017, 9 pages.

(Continued)

*Primary Examiner* — Thaddeus J Plecha
(74) *Attorney, Agent, or Firm* — Haynes and Boone, LLP

(57) ABSTRACT

A method for applying agency and regulation modeling in a multi-tenant architecture system includes accessing merchant's representation in an identity manager. The merchant is managed via a full representation by an original identity manager. The method includes performing a first service for the merchant via the representation, and determining, based on results of the first service and on policies of the first service provider, that performance of a second service is required for completion of the first service. The second service is provided by a second service provider onboarded into the first service provider, where the second service amends policy requirements of the first service provider. The method includes accessing a first subservice of the second service using the representation to generate second results for use at a second subservice of the second service, the second subservice configured to use transaction resources of the first representation.

20 Claims, 7 Drawing Sheets

(51) Int. Cl.
*G06F 9/50* (2006.01)
*G06F 16/18* (2019.01)
*H04L 65/1063* (2022.01)
*G06Q 10/0631* (2023.01)
*G06Q 20/32* (2012.01)
*G06Q 10/067* (2023.01)

(52) U.S. Cl.
CPC ....... *G06Q 10/067* (2013.01); *G06Q 10/0631* (2013.01); *G06Q 20/326* (2020.05); *H04L 63/0815* (2013.01); *H04L 63/20* (2013.01); *H04L 65/1063* (2013.01); *G06F 2009/45587* (2013.01); *G06F 2009/45595* (2013.01)

(56) References Cited

U.S. PATENT DOCUMENTS

| | | | |
|---|---|---|---|
| 8,819,801 | B2 | 8/2014 | Sangubhatla et al. |
| 8,918,641 | B2 | 12/2014 | Smith et al. |
| 9,058,481 | B2 | 6/2015 | Prasad et al. |
| 9,218,599 | B1 | 12/2015 | Hilbring |
| 9,710,664 | B2 | 7/2017 | Sathyadevan et al. |
| 9,781,122 | B1 | 10/2017 | Wilson et al. |
| 9,992,186 | B1* | 6/2018 | Drozd ................ H04L 63/102 |
| 10,581,867 | B2* | 3/2020 | Srinivasan ....... G06Q 10/06315 |
| 10,931,656 | B2 | 2/2021 | Carru et al. |
| 2002/0010591 | A1 | 1/2002 | Pomerance |
| 2004/0117298 | A1 | 6/2004 | Algiene et al. |
| 2006/0059565 | A1 | 3/2006 | Green et al. |
| 2007/0150480 | A1 | 6/2007 | Hwang et al. |
| 2008/0154783 | A1 | 6/2008 | Rule et al. |
| 2009/0125972 | A1 | 5/2009 | Hinton et al. |
| 2011/0276892 | A1 | 11/2011 | Jensen-Horne et al. |
| 2012/0072307 | A1 | 3/2012 | Kassaei et al. |
| 2012/0197963 | A1 | 8/2012 | Bouw et al. |
| 2012/0258777 | A1* | 10/2012 | Huang ................ H04W 4/60 709/204 |
| 2013/0046600 | A1 | 2/2013 | Coppinger |
| 2013/0318241 | A1 | 11/2013 | Acharya et al. |
| 2014/0230076 | A1 | 8/2014 | Micucci et al. |
| 2015/0161620 | A1 | 6/2015 | Christner |
| 2015/0193775 | A1 | 7/2015 | Douglas et al. |
| 2015/0193858 | A1 | 7/2015 | Reed et al. |
| 2016/0087960 | A1 | 3/2016 | Pleau et al. |
| 2016/0142409 | A1* | 5/2016 | Frei ..................... G06F 21/33 713/176 |
| 2016/0337365 | A1 | 11/2016 | Beiter |
| 2017/0012962 | A1 | 1/2017 | Lissack et al. |
| 2017/0048306 | A1 | 2/2017 | Amador |
| 2017/0318128 | A1 | 11/2017 | Ananthanarayanan et al. |
| 2018/0013763 | A1 | 1/2018 | Wilson et al. |
| 2018/0075231 | A1 | 3/2018 | Subramanian et al. |
| 2018/0081905 | A1 | 3/2018 | Kamath et al. |
| 2018/0309759 | A1* | 10/2018 | Leibmann ............ H04L 63/105 |
| 2019/0014120 | A1 | 1/2019 | Drabant |
| 2019/0026486 | A1 | 1/2019 | Pleau et al. |
| 2020/0007529 | A1 | 1/2020 | Bahrenburg et al. |
| 2020/0412538 | A1 | 12/2020 | Rosado |

OTHER PUBLICATIONS

Axero., "Single Tenant vs Multi Tenant Business Software", COMMUNIFIRE, Retrieved on Apr. 30, 2018, Retrieved from the Internet URL: https://axerosolutions.com/blog/single-tenant-vs-multi-tenant-business-software, 9 pages.

Crown N., "An Introduction to SCIM: System for Cross-Domain System for Cross-Domain Identity Management", RSAConference, Europe, 2012, Retrieved on Apr. 24, 2018, Retrieved from the Internet URL: https://docs.huihoo.com/rsaconference/europe-2012/How-SCIM-Simplifies-Migration-to-Cloud-Services.pdf, 24 pages.

Ed K.L., et al., "System for Cross-Domain Identity Management: Definitions, Overview, Concepts and Requirements" Retrieved on Apr. 24, 2019, Retrieved from the Internet URL: https://www.rfc-editor.org/rfc/pdfrfc/rfc7642.txt.pdf, 19 pages.

European Application No. 19819808.7, Extended European Search Report dated Jun. 8, 2021, 7 pages.

International Appl. No. PCT/US2019/037242, International Preliminary Report on Patentability dated Dec. 24, 2020, 12 pages.

International Appl. No. PCT/US2019/037242, International Search Report and Written Opinion daated Oct. 4, 2019, 12 pages.

International Appl. No. PCT/US2019/064325, International Search Report and Written Opinion dated Mar. 24, 2020, 16 pages.

International Application No. PCT/US2019/064325, International Preliminary Report on Patentability dated Jun. 17, 2021, 6 pages.

International Application No. PCT/US2019/068993, International Preliminary Report on Patentability dated Jul. 8, 2021, 8 pages.

International Application No. PCT/US2019/068999, International Preliminary Report on Patentability dated Jul. 8, 2021, 7 pages.

International Application No. PCT/US2019/068999, International Search Report and Written Opinion dated Mar. 31, 2020, 8 pages.

International Search Report and Written Opinion for International Application No. PCT/US2019/68993 dated Mar. 31, 2020, 14 pages.

International Search Report and Written Opinion for International Application No. PCT/US2019/68999 dated Mar. 31, 2020, 14 pages.

Jones M., et al., "JSON Web Token (JWT)," Internet Engineering Task Force (IETF), May 2015, 30 pages.

Kabbedijk J., et al., "Multi-Tenant Architecture Comparison", Retrieved on Apr. 30, 2018, Retrieved from the Internet URL: https://pdfs.semanticscholar.org/17fb/e778244aa190da9d56c5fb8c2e64c63cd621.pdf, 8 pages.

Microsoft., "Chapter 2: Key Principles of Software Architecture," Retrieved on Apr. 30, 2018, 6 pages.

Mundra M., "Multi-Tenant Vs. Single-Tenant Architecture (SaaS)," Retrieved from the Internet URL: https://blogs.sap.com/2015/07/12/multi-tenant-vs-single-tenant-architecture-saas/, Jul. 12, 2015, 5 pages.

Sageintacct., "Multi-Tenancy is Fundamental to SaaS Applications—And it's Better for you, too" Retrieved on Dec. 7, 2018, Retrieved from the Internet URL: https://www.sageintacct.com/cloud-erp/multi-tenant-cloud-architecture, 4 pages.

Solanki N., et al., "Multi-Tenant Access and Information Flow Control for SaaS", IEEE International Conference on Web Services, Jun. 27, 2016, Retrieved from the Internet URL: https://ieeexplore.ieee.org/document/7557990, Retrieved on Mar. 3, 2021, 8 pages.

Anonymous "Multitenancy—Wikipedia," Mar. 5, 2014, Retrieved from the Internet: <https://en.wikipedia.org/w/index.php?title=Multitenancy&oldid=598245774>.

* cited by examiner

AGENCY AND REGULATION MODELING FOR TRANSACTIONS IN MULTI-TENANT SYSTEMS This application claims the benefit of and is a continuation-in-part of U.S. application Ser. No. 16/009,994, titled "Unified Identity Services for Multi-Tenant Architectures," filed on Jun. 15, 2018, the disclosure of which is incorporated herein by reference in its entirety.

BACKGROUND

Embodiments of the present disclosure generally relate to the field of software architecture and, more particularly, to managing how various entities are on-boarded, managed, and/or accessed in a multi-tenant system architecture.

Complex software systems can have various architectures, including a single-tenant software architecture and a multi-tenant software architecture, among others. In a single-tenant software architecture, each entity (such as a company or a portion of that company) can have their own instances of each software application, data, and any supporting infrastructure. In a single-tenant architecture, the software for each tenant entity can be customized as desired. However, drawbacks of using the single tenant architecture include expense in resources, as well as requirements to host, customize, and maintain separate software applications for each tenant.

In contrast, in a multi-tenant software architecture, each entity can share the same instances of applications, data, and/or infrastructure. A multi-tenant software provider can provision their applications and/or resources to multiple entities from a single software architecture. In multi-tenant software architecture, access to data can be shared among the various entities. By sharing much of the applications, data, and software, various resources such as installation, configuration, number of physical servers, maintenance, and even power can be optimized. However, drawbacks of using multi-tenant architecture include complexity of managing how multiple software applications are configured and shared among multiple clients. Also, design of multi-tenant architecture-based software systems that provides secure and reliable access to the data, resources, and/or transaction services that operate using the data and/or resources can be problematic. Furthermore, interoperability difficulties may arise when using software applications, in a multi-tenant architecture system, that were initially managed and/or hosted by different businesses.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
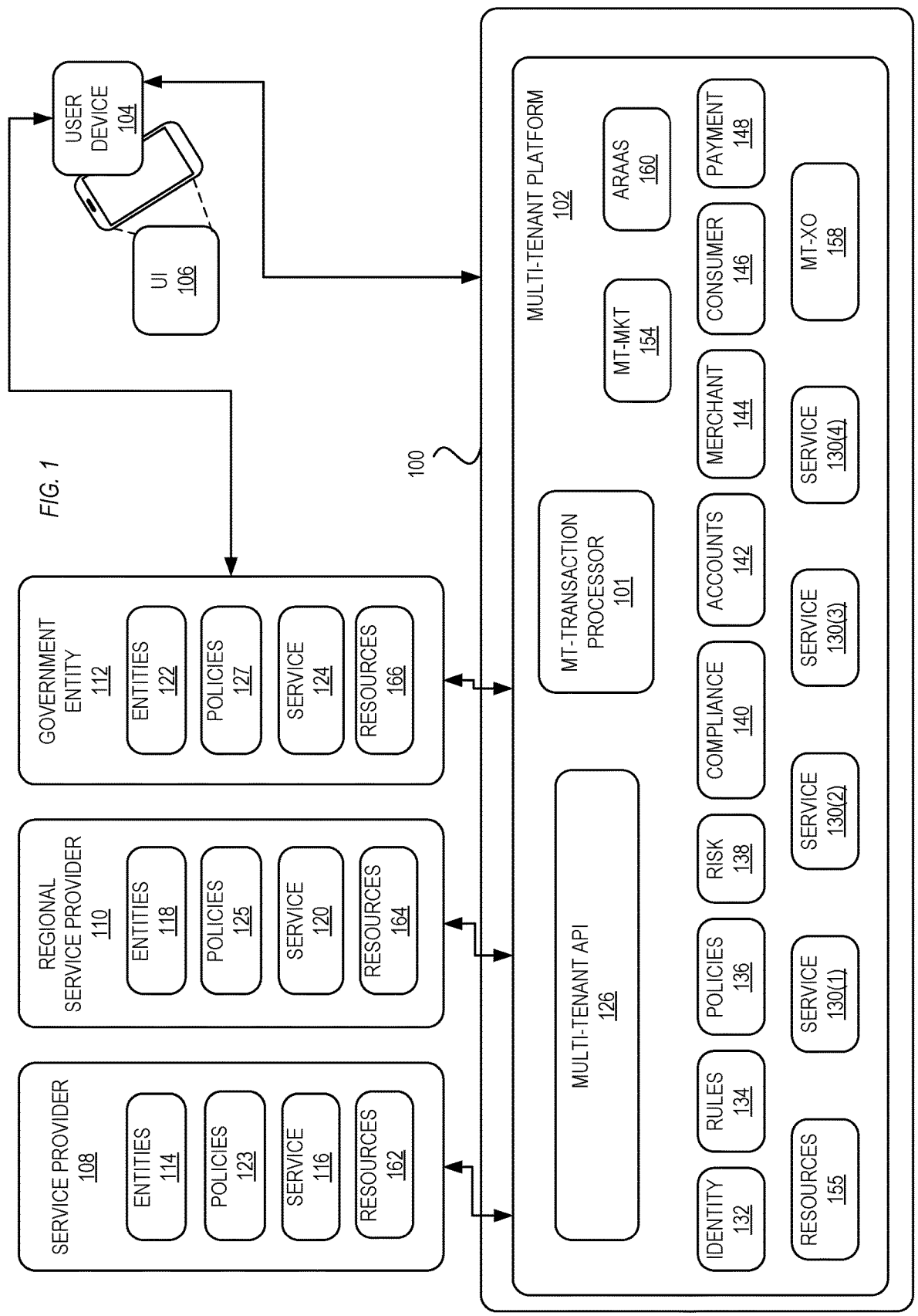
FIG. 1 is a system diagram illustrating embodiments of a multi-tenant software architecture system that can be accessed by communicating with a user device.

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others.

In a multi-tenant software architecture described herein, each tenant can share the applications, data, and/or infrastructure. A multi-tenant software provider can use a multi-tenant software platform to provision applications and/or resources to multiple entities. The multi-tenant software platform can facilitate addition of new tenants and onboard data and/or services provided by these new tenants. The multi-tenant software platform can implement rules and policies for data access by various entities across the tenants. The multi-tenant software platform can use identity services to provide access to these services, such as from an entity associated one tenant to a service provided by another tenant. The multi-tenant software platform can facilitate transaction services between tenants, such as a transaction service originating at one tenant that accesses resources at another tenant. The type of resources or data specific to certain tenant can be dictated by regional rules, and could even act different for a specific tenant based on where they are being used (e.g., for multi jurisdictional tenants).

The multi-tenant software platform (also referred to as a multi-tenant platform) can include multiple tenants that have been previously on-boarded. The multi-tenant platform can facilitate access, using a unified identity associated with a user, to the entities, policies, and services of these tenants. The tenants can be hosted and managed by service providers. Access to the services can be determined based on privileges of the unified identity, on policies of each of the tenants, and/or locations (e.g., jurisdictions) of each tenant. The services can include various merchant services, such as in-store checkout (at a certain tenant) via a user device (associated with the unified identity), access to an online store of the tenant, order-ahead at a certain store of the tenant, a cash-in process (e.g., at an Automated Teller Machine (ATM)) at a certain tenant, a cash-out process (e.g., at an ATM), self-checkout for fuel at pay-at-the-pump stations of the tenant, among others. A single transaction by a tenant could involve many sub-actions (e.g., subservices) that can be controlled by rules for each of the locations or compliance stipulations based on regions, products, services or other factors that control the actions in the multi-tenant environment. For example, a transaction can have multiple subservices, which can share resources and environments. However, the multi-tenant platform can control access to the resources for each of the subservice based by rules for that transaction, which can result with different subservices accessing a different subset of the transaction's resources.

The services can include SaaS and Platform as a Service (PaaS) services and/or other cloud services that are accessible by the user device. For example, the solution provider can provide access, to the user device, to various software applications, or deliver such software to the user device. The services can also include inter-tenant transaction services, where a transaction service that is originated at a first tenant needs to access transaction resources at a second tenant. The multi-tenant platform can access other services, such as multi-tenant identity services and/or multi-tenant transaction resource service to determine how to process inter-tenant transactions.

The multi-tenant platform can thus utilize unified identity services to provide access to selected services and/or data of the tenants based on policies associated with each of the tenants. The multi-tenant platform can use separate databases to store data to achieve isolation, such as when new tenants are on-boarded onto the existing platform, and to provide logical and/or physical data isolation to comply with compliance, or legal requirements. Tenants/transactions that cross jurisdictions (and thus legal boundaries) can introduce sophisticated requirements that can be met by using the multi-tenant platform that accounts for local and regional rules. The multi-tenant platform can be triggered to apply the local and regional rules based by characteristics of the transaction (including any sub-transactions) being processed.

Shared data access can be made possible by on-boarding the tenants and selectively cross-exposing services. For example, for a multi-tenant platform managed by PAYPAL, certain capabilities of the multi-tenant platform such as Risk-as-a-Service (RaaS) and/or ARaaS (Agency and Regulation-as-a-Service) can be provided to third-party on-boarded tenants such as FACEBOOK, GOOGLE, and their respective organizations, such as marketplaces, shops, and others. Thus, in some embodiments, the multi-tenant platform can include a core tenant (such as PAYPAL) that offers core services and infrastructure (including Identity-as-a-Service (IaaS) functionality and ARaaS) and any additional data access to selected tenants and/or users accessing the multi-tenant platform from that tenant. The level of access to the core services and/or infrastructure can be determined by rules and/or policies of each tenant and/or of the multi-tenant platform.

The multi-tenant platform can onboard new tenants by using an identity manager that uses one or more data structures. In some embodiments, the multi-tenant platform can expose appropriate user experiences for a user application based on the user request. The multi-tenant platform can implement methods for providing IaaS services to various entities and/or tenants. The multi-tenant platform can provide the IaaS and other services (such as ARaaS) by accessing services and entities that are modeled via various hierarchical data structures (or modeled by using other implementations). The multi-tenant platform can onboard third-party tenants and provide inbound and outbound services for these tenants and their respective organizations. For example, the multi-tenant platform can onboard GOOGLE and various organizations of GOOGLE such as INSTAGRAM and SHOPS, and their respective merchants. In another example, the multi-tenant platform can onboard merchants for the core tenant, as well as any cross-border and regional partners for those merchants. The multi-tenant platform can also onboard various governmental entities with associated rules and regulations.

In some embodiments, the multi-tenant platform can access a merchant representation in an identity manager. The merchant is managed in original data structure by a merchant service provider. The multi-tenant platform can perform a first service for the merchant via the representation, and determining, based on results of the first service and on policies of the first service provider, that performance of a second service is required for completion of the first service. The second service is provided by a second service provider onboarded into the first service provider, where the second service amends policy requirements of the first service provider. The multi-tenant platform can include accessing a first subservice of the second service using the representation to generate second results for use at a second subservice of the second service, the second subservice configured to use transaction resources of the first representation. The following description and associated Figures illustrate various embodiments directed to the ideas listed above.

FIG. 1 is a system diagram illustrating embodiments of a multi-tenant software architecture system that can be accessed by communicating with a user device. In an overview of the system diagram, a user device 104 can communicate with a processing system 100 that includes a multi-tenant platform 102. The processing system 100 can process requests using a multi-tenant transaction processor (mt-transaction processor) 101. The multi-tenant platform 102 can provide access to multiple service providers 108, 110, and 112. In some embodiments, the multi-tenant platform 102 can model each of the service providers 108-112 such that the mt-transaction processor 101 can access services 116-124, policies 123-127, and/or resources 162-166 of the service providers.

The multi-tenant platform 102 includes core services at elements 132-148, as well as additional services 130(1)-130(5). The multi-tenant platform 102 can provide services to the service providers 108-112, such as IaaS services that may be required for accessing other services, including ARaaS. Thus, the multi-tenant platform 102 can manage a plurality of tenants, each one of which can be associated with one or more services, which are then exposed for access. In some embodiments, each of the service providers 108-112 can be the actual providers that are then represented (e.g., by modeling) in the multi-tenant software architecture (i.e., in the multi-tenant platform 102). Although not shown in FIG. 1, each of the service providers 108-112 can include a respective transaction processor for processing own requests. The mt-transaction processor 101 can be a transaction processor that was fully integrated onto the multi-tenant platform 102. The mt-transaction processor 101 can be a default transaction processor for processing transactions.

The multi-tenant platform 102 can store user information for users at the accounts 142. In some embodiments, the accounts 142 includes information for users (also referred to as "core users") of a core tenant. The core tenant can be one of the service providers 108-112, or a service provider that is fully integrated into the multi-tenant platform 102. The multi-tenant platform 102 can facilitate provision of various core services to the core users. The core services can include identity services 132, risk services 138, compliance services 140, payment services 148 (including payout services), as well as MT-XO (multi-tenant checkout service) 158. In one embodiment, the multi-tenant platform 102 provides IaaS services at the identity services 132 element. The core services can also include access to policy configuration 136, as well as access to accounts 142, merchants 144, and consumers 146. The accounts 142 are associated with the identity services 132. The multi-tenant platform 102 can also provide inter-tenant transaction services, such as between tenants 108 and 110, where the tenants 108 and 110 need not be fully integrated.

The identity services 132 can generate and maintain one or more hierarchical data structures, including a core hierarchical data structure for managing its core entities. In some embodiments, at least part of some data structures can be distributed (e.g., at different physical locations such as different jurisdictions) with unique keys or other linking solutions to enable compliance and legal alignment, while retaining masking of any non-transitory information. The cross jurisdictional identification across this distribution can be maintained while protecting key elements in other jurisdictions. For example, a certain tenant can have different identifications (e.g., different tax IDs) in different regions. A certain identification can be used to access a portion of that tenant's data structure, without providing transparency into remaining data structure portions for that tenant for different jurisdictions.

The service provider 108 can include entities 114, policies 123, services 116, and transaction resources 162. Similarly, the regional service provider 110 and a government entity 112 include entities 118 and 122, policies 125 and 127, services 120 and 124, and/or transaction resources 164 and 166, respectively. The elements 114, 123, 116, and 162 of the service provider 108, and similar elements of the service providers 110 and 112 can be modeled by the multi-tenant platform 102, as discussed below. In some embodiments, the MT-MKT 154 can model and manage the relationships between merchants/sellers of the service providers, while the identity services 132 model and maintain identity of various entities across the multi-tenant platform 102. In some embodiments, a certain service provider can be fully integrated onto the multi-tenant platform 102, a process which can include generating the core hierarchical data structure for the core tenant. In this example, the identity services 132 can manage the core users (e.g., in its own namespace), meaning that the service provider 108 does not have its own identity service for its own users.

The service providers 108, 110, and 112 can be on-boarded onto the multi-tenant platform 102 and manage their own identities (e.g., using their pre-existing 3P-IdPs as discussed below with reference to FIG. 2). Any access from the service provider 110 for access of a service other than its own services 120, such as access of a service 130(1), uses a unified identity for access of services and/or data across the multi-tenant platform 102. During the onboarding process, the multi-tenant platform 102 can generate models of the respective service provider(s) by the identity services 132 and the MT-MKT 154. In some embodiments, the MT-MKT 154 is logically modeled as a part of the identity services 132 (e.g., as a subset of its hierarchical data). In some embodiments, the MT-MKT 1 can be logically de-coupled from the identity services 132, but have links/associations with corresponding entities in the identity services 132.

The onboarding process can include accessing identity services to determine at least a portion of the entities that are being managed by the respective identity service. If the entities are not being migrated (e.g., by being fully integrated) to the identity services 132, then the identity services can generate representations of the entities being on-boarded in the core hierarchical data structure. These representations are then being used by the IaaS service to determine and use the unified identity (for a certain user) across the multi-tenant platform 102. The representations can include light-weight elements and/or linked elements. The process of generating and using user representations is explained in more detail below.

The identity services 132 can manage and access the policy configuration 136, such as to enforce access to certain customer and/or merchant domains. The policy configuration 136 can be accessed via the hierarchical data structures (discussed below) for each entity. In some embodiments, the policy configuration 136 (referred to as policies 136 for convenience) can be accessed by the ARaaS 160 to determine actions needed to comply with requirements of various rules such as rules 134, regulations, taxes, tariffs, and/or licensing requirements for transactions performed by merchants of one of the service providers. In some embodiments, the policies 136 can be updated using the policies 127 of the government entity 112. The ARaaS 160 can perform the policy updates, such as based on the modeled taxes, tariffs, licensing requirements and fees for cross-border transactions between onboarded merchants and customers of the multi-tenant platform 102 (as discussed below with reference to FIG. 4)

During the onboarding process, a marketplace service 154 can model the actual entities (e.g., the entities 114 such as merchants of the service provider 108 being on-boarded). The modeling includes determining hierarchical organization, such as by jurisdictions (e.g., by countries) and/or organization types (a marketplace organization and a shops organization). For the onboarding process, the marketplace service 154 can facilitate application of certain inbound services onto the entities 114, such as compliance services 140. For example, the marketplace service 154 can facilitate applying of the compliance service 140 to one of the entities 114 via a modeled representation of that entity.

The ARaaS 160 can perform various services for merchants of the service providers 108-112, as well as any merchants onboarded into the multi-tenant platform 102. For example, the MT-transaction processor 101 can perform a transaction for a merchant of the service provider 108 that is represented in the identity services 132. The MT-transaction processor 101 can determine, based on the policies 136 and/or policies 127 of the government entity 112, that the transaction requires a tariff service and a licensing service (which are accessible at the service 124 of the government entity 112). The ARaaS 160 can then perform the tariff service and the licensing service by accessing functionality of the service 124. In some embodiments, the functionality of the service 124 can be modeled by the ARaaS 160, such as discussed below with reference to FIG. 4. In some embodiments, the ARaaS 160 can model behavior and requirements of various rules, regulations, taxes, tariffs, and/or licensing requirements of the government entity 112 (as well as additional governmental entities).

In some embodiments, the multi-tenant platform 102 can determine whether any outbound services that are configured for the onboarded merchant can be applied to the merchant being on-boarded. For example, an outbound service can include payout transactions that includes transferring (e.g., for completion of a service or purchasing of a good) a certain amount of resources 155 from an account of customers of the multi-tenant platform 102 to an account at a certain financial instrument of the actual merchant of a marketplace of the service provider 108.

In some embodiments, during the onboarding process, the ARaaS 160 can determine a potential of interactions of the newly onboarded tenant and/or of any onboarded merchants for that tenant with appropriate rules and/or regulations. For example, an onboarded merchant can have facilities in multiple countries (and thus multiple jurisdictions), which can trigger a potential use of a different set of rules/regulations for each jurisdiction. Thus, each jurisdictional instance of that tenant can have a different set of associated rules, which can also mark a different set of potential transactions being impacted by ARaaS 160. As discussed above, during the onboarding process, the distribution of the tenant information (such as data storage) can be localized as required by rules for their respective jurisdictions.

In some embodiments, the ARaaS 160 can thus be set up, during onboarding of each tenant and/or merchant, to be triggered for certain tenants, organizations, and/or transactions. In some embodiments, tariffs for various products offered by certain tenants/merchants can be pre-generated based on anticipated transaction locations. In some embodiments, any known relationships between entities (e.g., a merchant and a certain client), can be used to pre-generate potential subservices for transactions between these entities.

The ARaaS 160 can call the payment services 148 (at the government entity 112) to perform payouts to accounts that are associated with the resources 166 as part of performing certain taxes that are required for a transaction between an on-boarded customer of the multi-tenant platform 102 and an onboarded merchant of the regional service provider 110. The ARaaS 160 can call the payment services 148 based on determinations made by the modeled behavior and requirements of the various rules, regulations, taxes, tariffs, and/or licensing requirements of the government entity 112.

In some embodiments, the MT-transaction processor 101 can access modeled resources of the service providers 108, 110, and/or 112. The multi-tenant platform 102 then can facilitate access to actual transaction resources that are associated with the modeled resources. The transaction resources can correspond to certain financial instruments. Upon processing, a value of that transaction resource at one tenant can be changed, such as decremented from one value to another value (and potentially incremented at another value of another transaction resource at another tenant).

The multi-tenant platform 102 can communicate, via the multi-tenant API 126, with the service providers 108-112 and/or the user device 104. The multi-tenant platform 102 can provide, based on a certain unified identity, information related to a tenant, associated services, and/or associated user experiences, to a requesting entity via the multi-tenant tenant API 126. Furthermore, the multi-tenant platform 102 can facilitate communication between various tenants 108-112 (i.e., via their respective representations), such as by providing IaaS services and use of unified identity. For example, a new tenant, such as the service provider 112, can be on-boarded by the multi-tenant platform 102. Information on the new tenant can be stored by one or more of the core services 132-148. In some implementations, upon onboarding, a namespace (e.g., its entities such as merchants and/or customers) that is associated of each tenant can be onboarded onto the identity services 132. In some embodiments, one or more of services of the new tenant, such as the service 124, can be exposed (e.g., as a model) for access to other users of the multi-tenant platform 102. In one embodiment, the core service provider (that is integrated into the multi-tenant platform 102) can process a payment and order fulfilment for products/services offered by the service provider 108 and provided via user experiences accessed at the UI 106.

In one embodiment, the multi-tenant platform 102 can also generate a representation 130(5) of the service 124 at the multi-tenant platform 102. Thus, any access from other tenants, such as from the user device 104 or from the service provider 110), to the service 124 is performed via a unified identity (e.g., by using IaaS) at the service representation 130(5). In some embodiments, for onboarded tenants that are fully integrated, access to services of that tenant can be performed by the MT-transaction processor 101 directly, without using representations of the fully integrated service. In some embodiments, for onboarded tenants that are not fully integrated, access to services of that tenant can be performed by the MT-transaction processor 101 by calling the representation 130(5) of the onboarded (but not fully integrated) service. The representation 130(5) can then access the actual service 124.

The user device 104 can be any type of a computing device that can communicate user requests to the multi-tenant platform 102. The user device 104 can be implemented as a kiosk, a point-of-sale (PoS) terminal, a mobile device, among others. The user device 104 includes a user interface (UI) 106 through which the user can interact with displayed user experiences, such as to access certain services provided via the multi-tenant platform 102. The user device 104 can generate and communicate a user request for a certain service at the multi-tenant platform 102. The user device 104 can interface with the service provider 108-112 and/or with the processing system 100. The transaction processor then can communicate with various components of the multi-tenant platform 102, such as via the multi-tenant API 126.

The multi-tenant platform 102 can provide CaaS, via the compliance service 140, to ensure compliance of the merchants of the service provider 108. The multi-tenant platform 102 can provide risk analysis (e.g., via the Risk core service 138) to determine whether to perform services and/or process payouts for product/services offered by merchants of the service provider 108. The core service provider can process payouts from the user account that is associated with the user device 104. The core service provider can provide the payout services to accounts at organizations that are associated with each of the merchants.

Once on-boarded as a core tenant, the accounts of the core service provider can be stored and accessed directly at the multi-tenant platform at the accounts 142 element. For example, a buyer (e.g., a user of the user device 104) can be associated with one payment account, and the seller (e.g., one of the tenants) can be associated with another payment account at the payment system (which can be implemented using the processing system 100). Upon successfully performing the risk analysis on the requested service (e.g., a payout transaction), the core service provider can then perform (e.g., via the payment core service 148) a fund transfer from the buyer's payment account to the merchant's payment account.

The payment system can be implemented by PAYPAL or another online payment system that allows users to send, accept, and request fund transfers. In some embodiments, the user experience can also provide access to certain services. Thus, in addition, or instead of, a payment service, the user experience can include other functionality that is unique for the certain tenant, such as selection of items for order, access to certain SaaS functionality, among others. Thus, the solution provider can provide funds in/funds out services, as determined based on the location data, from the payment system to the users of the user devices.

For simplicity, FIG. 1 only shows a single user device 104. However, as discussed herein, the multi-tenant platform 102 interfaces with multiple user devices, and thus provides access to services to many different users. Similarly, the multi-tenant platform 102 can onboard multiple tenants in addition to the ones shown. The multi-tenant platform 102 can also have multiple core tenants that are incorporated as part of the core services 132-148.

Figure 2:
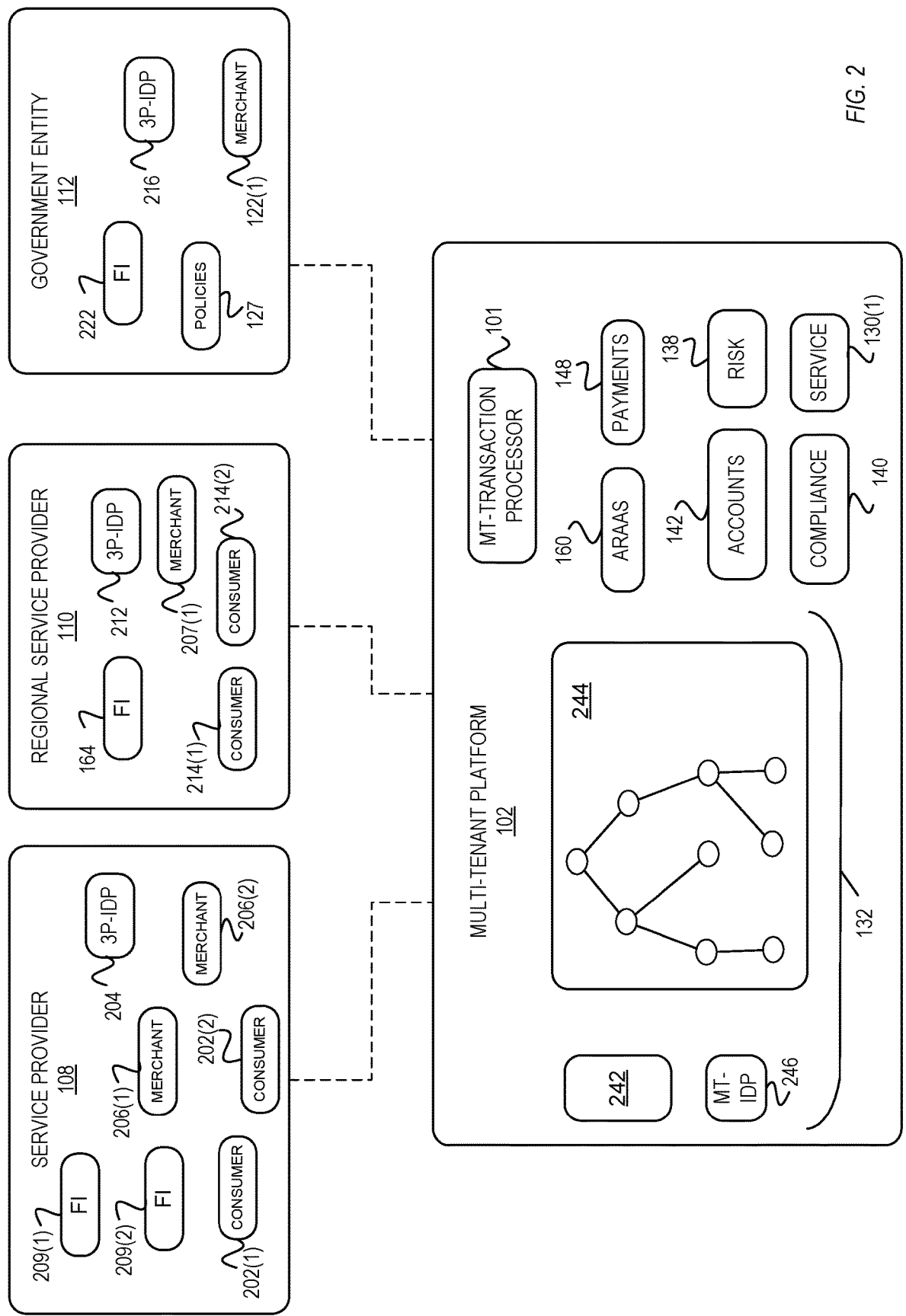
FIG. 2 is a system diagram illustrating embodiments of the multi-tenant software architecture of FIG. 1.

FIG. 2 is a system diagram illustrating embodiments of the multi-tenant software architecture of FIG. 1, including Agencies and Regulation as a Service (ARaaS). FIG. 2 shows embodiments of how the identity services of certain organizations of the service providers 108 and 110, as well as of the government entity 112 are modeled by the multi-tenant platform 102. As shown, a marketplace organization of the (actual) service provider 108 can include a third-party identity provider (3P-IDP) 204 that manages entities of merchant 206(1) and 206(2), and entities of consumer 202(1) and 202(2). Similarly, the (actual) service provider representation 110 can include a 3P-IDP 204 that manages entities of merchant 207(1) and consumer 214(1) and 214(2). In some examples, prior to being on-boarded, the service provider 108 is operable to perform services 116 (optionally based on the policies 123) for the entities 114 using the resources 162, without using the multi-tenant platform 102.

FIG. 2 shows that the multi-tenant platform 102 includes the identity service 132, the accounts 142 element, the risk 138 element, the compliance element 140, as well as services 130(1). It is noted that the multi-tenant platform 102 as shown in FIG. 2 can include all of the services of FIG. 1, some of which are not shown in FIG. 2 for simplicity. The service provider 108 can be modeled by the identity service 132 as part of the hierarchical data structure 244. As discussed below, the identity service 132 can model some parts of the service provider 108, including the 3P-IDP 204 that indicates the merchants 206(1) and 206(2), the consumers 202(1) and 202(2), and/or the FIs 209(1) and 209(2). Each of the FIs 209(1) and 209(2) can be associated with a respective merchant 206(1) and 206(2), such as to accept payout services. It is noted that although the current disclosure discusses using hierarchical data structures to manage and facilitate operations on various entity representations, other implementations are contemplated, including tables, linked lists, and/or graphs, among others. Thus, the term hierarchical data structures encompasses various implementations, and is not meant to be limiting.

The identity service 132 can similarly model some parts of the regional service provider 110. The identity service 132 can model each of the service providers 108 and/or 110 as service provider representations that can be generated during onboarding of the respective service providers 108 and/or 110. The 3P-IDPs 308 and 310 (of FIG. 3) can represent, in the hierarchical data structure 244, the actual IDPs 204 and 212 of the service providers 108 and 110, respectively.

The identity service 132 can also model some parts of the governmental entity 112. In some instances, the governmental entity 112 can use a 3P-IDP 216 to indicate relationships between merchants and certain FIs, that may occur over specialized rails such as NPCI/RBI (National Payments Corporation of India/Reserve Bank of India) that use UPI/RuPay (Unified Payments Interface/RuPay Indian domestic card scheme), or a certain national bank. The governmental entity 112 can include an FI 222, which can indicate one or more accounts to which the merchants 122(1) (i.e., merchants of the governmental entity 112) and/or onboarded merchants of the service provider 108, 112, and of the multi-tenant platform 102 can provide payouts. Access to the FI 222 can be performed via access points that couple representations of the FI 222 of the government entity 112 in the identity services 132 and the actual FI 222.

The ARaaS 160 can access selected merchant representations via the identity service 132, and based on an underlying transaction, determine that a certain tariff must be determined and settled prior to completion of the underlying transaction. The underlying transaction can a payment for a transaction (of transfer of a selected product) between an onboarded merchant of the service provider 108 and an onboarded customer of the regional service provider 110. The ARaaS 160 can then determine, based on the policies 127, to generate a certain license and to request a payment of a certain tariff and/or tax.

The identity service 132 includes an access tier 242 and the hierarchical data structure 244 that is managed by an MT-IDP 246. The multi-tenant platform 102 also includes services 138, 142, and 130(1)-130(2). The access tier 242 is a part of the identity service 132 that customizes data associated with the service provider when being on-boarded with the multi-tenant platform 102. For example, the access tier 242 includes information about the products and/or services being offered by the service provider 108, as well as service endpoints for accessing services (e.g., the service 116) offered by the service provider 108. The service endpoints can be referenced by a corresponding node in the hierarchical data structure 244 that represents the service provider 108.

Various embodiments of how the hierarchical data structure 244 is generated and accessed are discussed below with reference to FIG. 3. The MT-IDP 246 can generate and manage representations of the entities of the onboarded tenants, i.e., entities 206(1), 206(2), 202(1), and 202(2), as well as the 3P-IDP 204 of the service provider 108. Similarly, the MT-IDP 246 can generate and manage representations of entities 214(1), 214(2), 212 of the service provider 110.

Since each of the service providers 108 and 110 includes own 3P-IDP 204 and 212 respectively, each of these tenants can continue to manage the identities of their own respective entities. For example, the service provider 110 can continue to manage the entities 214(1)-214(2), including managing identity information, contact data, and any characteristics of the consumers 214(1) and 214(2). The service provider 110 can update any changes to the entities 214(1) and 214(2) to the multi-tenant platform 102, such as via a representation of the 3P-IDP 204 in the hierarchical data structure 244. These 3P-IDP 212 originated updates are used to keep the data of their respective representations up-to-date. Similarly, any services (such as core services) performed via the representations of the hierarchical data structure 244 can be propagated back to the 3P-IDP 212.

The identity services 132 allow users to be onboarded as entities onto any of representations of the service providers 108-112. As the service provider itself is a tenant in the multi-tenant architecture 102, a representation of the user would be created by the identity services 132 (such as under a 3P-IDP representation for that tenant representation in the hierarchical data structure 244). That 3P-IDP can be indicated as a system-of-record (SOR) for that onboarded user. The multi-tenant platform 102 can use the identity services 132 to identify the same user and his/her transaction resources across various namespace, thus enabling the same user to have multiple accounts in different namespaces and potentially linking or federating these accounts.

In some implementations, the multi-tenant platform 102 can enable co-ordination of multiple identity namespaces (e.g., separate namespaces associated with the service provider 108, the service provider 110, as well another namespace associated with the fully integrated service provider of the multi-tenant platform 102) to efficiently and securely transfer transaction resources between identities corresponding to entities of these namespaces. For example, a user in one domain (e.g., a namespace associated with the service provider 108) can, via the multi-tenant platform 102, lookup users in other namespaces (e.g., a user in a namespace associated with the service provider 110, or a merchant associated with the service provider 112) and establish a relationship including transaction resource transfers. The multi-tenant platform 102 can use separate identity and marketplace domains, among others, for separate transaction types.

Figure 3:
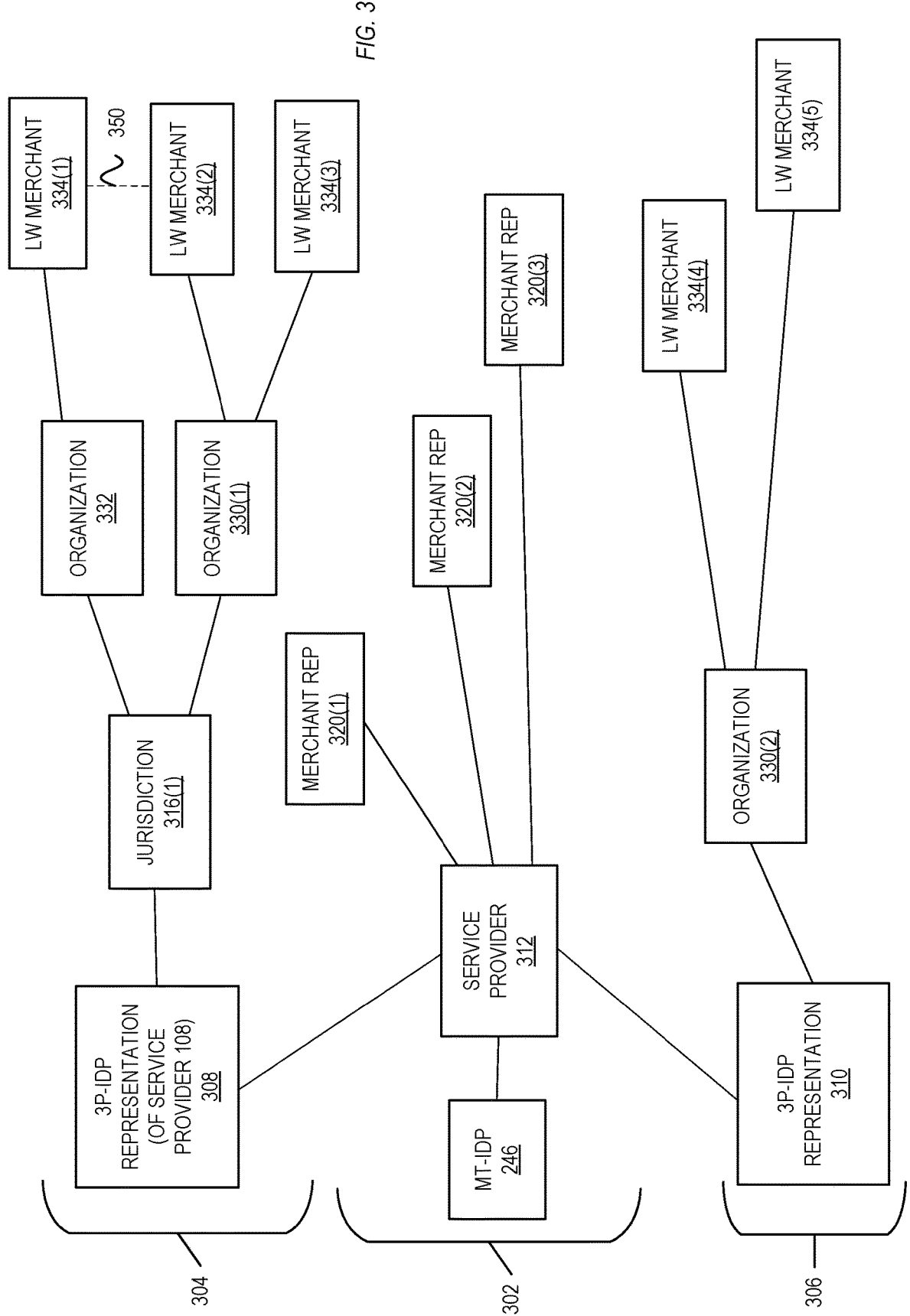
FIG. 3 is a diagram illustrating data structures used by the multi-tenant marketplace architecture systems.

FIG. 3 is a diagram illustrating hierarchical data structures used by the multi-tenant marketplace architecture systems. FIG. 3 illustrates several hierarchical data structures 302, 303, and 304 (which collectively can be referred to as the hierarchical data structure 274), which are accessible via the MT-IDP 246. FIG. 3 illustrates the relationships between the entities of the hierarchical data structures 302-306. The organization and linking of the hierarchical data structures of FIG. 3 can be referred to as a dependency graph. It is noted that the organization and type of the hierarchical data structures 302-306 is shown for illustrative purposes only, and that one or more of 3P-IDP representations 308 and 310 can be implemented using different data structures, as desired.

The first hierarchical data structure 302 illustrates service provider 312 that is fully integrated. It is noted that via the identity services 132, the fully integrated service provider can offer core services to various users of the multi-tenant architecture. As shown, the service provider 312 includes merchant representations 320(1)-320(3), which can include complete information on the actual merchant. The fully integrated merchant representations 320(1)-320(3) can be operated on directly by the multi-tenant platform 102. For example, the merchant representations 320(1)-320(3) can be fully integrated PAYPAL merchants.

The hierarchical data structure 304 can correspond to various entities of the on-boarded service provider 108, and is able to model complex relationships between the sellers, merchants, and various organizational entities of the service provider 108 (such as a regional partner). The hierarchical data structure 304 is managed by the 3P-IDP representation 308. Thus, the 3P-IDP representation 308 can be a representation, in the hierarchical data structure 244, of a portion of the 3P-IDP 204 that corresponds to the various sellers and merchants of the various organizations of the service provider 108. The Identity-as-a-Service (IaaS) services can be used by the MT-IDP 246 to properly create the relationships between the merchants being onboarded. As shown, the 3P-IDP 308 can itself be associated with the service provider 312.

The hierarchical data structure 304 can include various entities, including a jurisdiction 316(1) and organization 332 and 330(1). The hierarchical data structure 304 includes lightweight merchants LW 334(1)-334(3). A lightweight merchant is an entity that represents a corresponding entity in another hierarchical data structure, and that contains some of the data for that corresponding entity. The jurisdiction entity 316(1) indicates a certain jurisdiction, such as the USA or the EU. The hierarchical data structures can also enable the identification of items that might be part of a transaction that would trigger a tariff or tax rule based on composition, location, process, and/or other measurable attributes. Thus, the ARaaS 160 can access the hierarchical data structure 240 to determine when the tax or tariff rules could be triggered and applied to certain transactions for certain merchants. A part of this functionality is set-up during onboarding (as discussed above), but can be also refined during policy updates.

Each jurisdictional entity can have a different set of requirements indicating how transactions on their entities (e.g., the lightweight merchants 334(1)-334(3) can be performed. Each jurisdictional entity can also indicate a separate set of compliance requirements. The organization entity can indicate an organization type, such as a marketplace organization, an instore/shop organization, among others. The ARaaS 160 can determine, based on various policies, organizations, jurisdiction, and/or other elements of the merchants, as well as characteristics of the customer (such as the customer's location and/or jurisdiction), how to apply the modeled behavior and requirements of the various rules, regulations, taxes, tariffs, and/or licensing requirements.

The hierarchical data structure 304 includes LW merchant 334(1) in an organization 332 (which can be a certain business unit of the service provider 108) that is linked (i.e., using a link 350) in an organization 330(1) (which can be a marketplace of service provider 108). The link 350 can indicate that selected inbound services performed on the merchant representation 320(1) can be propagated onto the linked LW merchant 334(2). Thus, the link 350(2) is between two lightweight merchant representations.

Similarly, the hierarchical data structure 306 can correspond to various entities of the on-boarded service provider 110, and is able to model complex relationships between the sellers, merchants, and various organizational entities of the regional service provider 110. The hierarchical data structure 306 is managed by the 3P-IDP representation 310. The hierarchical data structure 306 can include various entities, including an organization 330(2). The hierarchical data structure 306 also includes lightweight merchants LW 334 (4) and 334(5).

During the process of onboarding the service providers 108 and 110, the multi-tenant platform 102 can generate the hierarchical data structures for identity and for sharing inbound/outbound services (referred to herein as marketplace services). As shown in FIG. 3, the multi-tenant platform 102 can generate the lightweight representations for that service provider's merchants and sellers. In some embodiments, the identity services generate separate identity hierarchical data structures where integrated identities of the merchants, their customers, and various transaction services are managed. Although the actual identities of the merchants are managed by that tenant's 3P-IDP, transactions are provided to the service provider and their merchants via the marketplace services.

Figure 4:
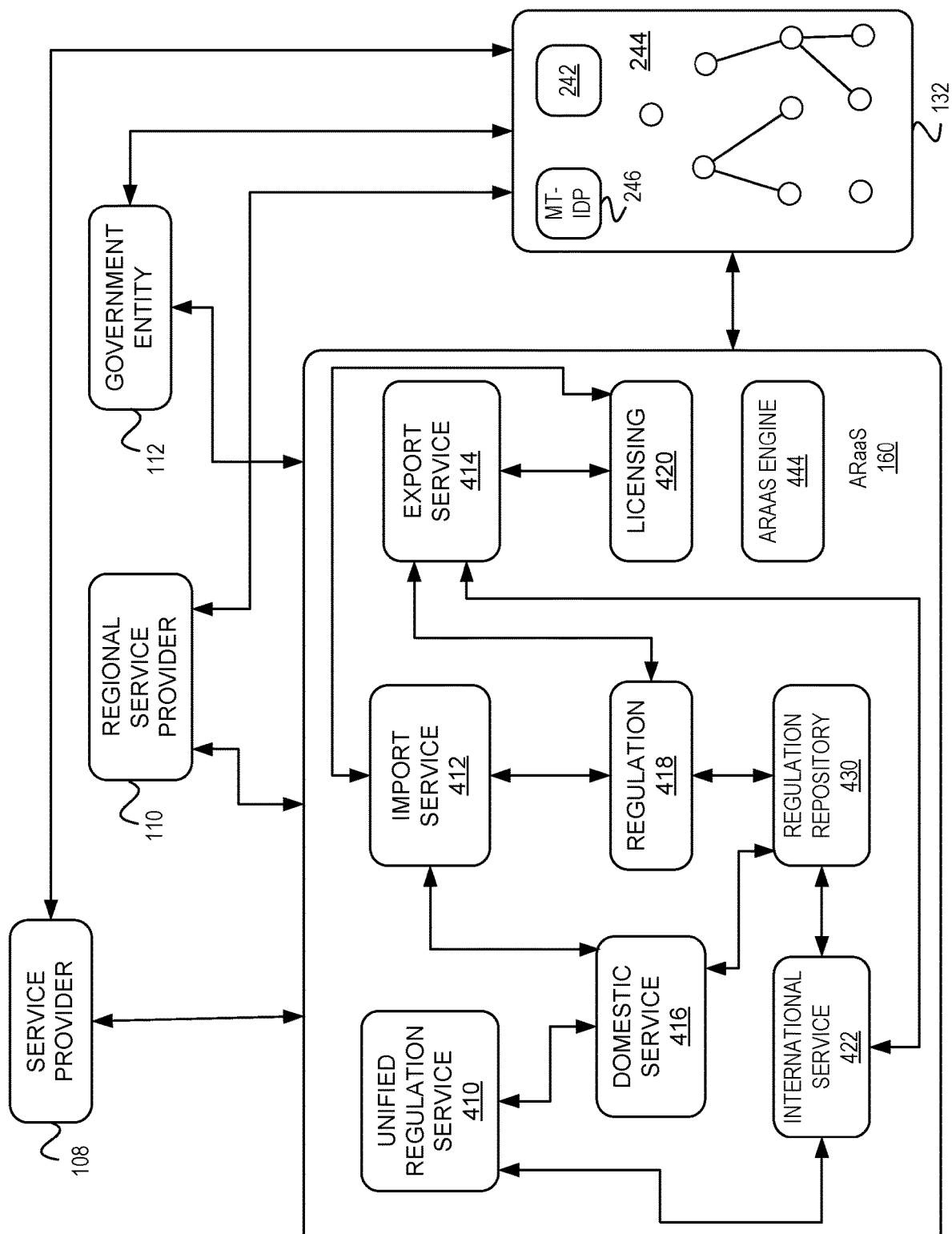
FIG. 4 is a diagram illustrating embodiments a model of Agency and Regulation as a Service (ARaaS) and various external and multi-tenant entities.

FIG. 4 is a diagram illustrating embodiments of a model of Agency and Regulation as a Service (ARaaS) and various external and multi-tenant entities. FIG. 4 illustrates a simplified model of the ARaaS 160 that includes various sub-elements of a unified regulation service 410, an import service 412, an export service 414, a domestic service 416, regulations 418, licensing 420, international service 422, a regulation repository 430, and an ARaaS engine 444. The ARaaS 160 is coupled to the service provider 108, the regional service provider 110, and the government entity 112. The ARaaS 160 can provide services, accessed using the identity services 132, to merchants of the service providers 108-112, as well as of the multi-tenant platform 102.

The ARaaS 160 itself, and each of its entities, provide functionality that is based on models of the onboarded governmental and regulatory services. For example, the ARaaS 160 (e.g., via the ARaaS engine 444) can determine the appropriate taxes, tariffs, licensing requirements and fees for cross-border transactions between onboarded merchants and customers of the multi-tenant platform 102. The ARaaS 160 can also provide access, via onboarded entities of the multi-tenant platform 102, to the financial instruments of the governmental agencies for payouts of the determined taxes, tariffs, and/or fees. The models can be created (e.g., during onboarding) using machine learning, decision trees, and/or other learning algorithms. The models can also be hardcoded based on the actual rules and regulations of the governmental agencies.

The ARaaS 160 can update the policies 136 of the multi-tenant platform 102 to provide uniform behavior for all transactions performed between merchants and/or customers. In some embodiments, the transaction processor (e.g., the MT-transaction processor 101) can access the policies 136 to determine whether to trigger the ARaaS 160 for a transaction that is being performed. Thus, for some transactions, the ARaaS 160 is not called. In some instances, a transaction that is initiated by an external service provider may use own (i.e., external) ARaaS functionality, and indicate that in the transaction such that the ARaaS 160 is not triggered.

The ARaaS engine 444 can access the MT-Identity 132 to access attributes of the merchant and/or customer representations for transactions being processed. In some embodiments, during the onboarding process, the ARaaS engine 444 can determine, for each merchant, what type of transactions would trigger execution of the unified regulation service, and/or the export service. For example, during the onboarding process, the ARaaS engine 444 can generate certain triggering rules for each merchant and/or transaction. During processing of transactions by the multi-tenant processor, the ARaaS engine 444 can be triggered, based on the triggering rules. Execution of the ARaaS engine 444 can be implemented via callbacks, webhooks, or related techniques. In some implementations, the ARaaS engine 444 can be executed (e.g., by the transaction processor) for certain transactions; and/or transactions of certain merchants, tenants, and/or jurisdictions. For example, the hierarchical data structures can enable the identification of transaction items that can trigger a tariff or tax rule based on composition, location, process, and/or other measurable attributes of the respective transaction.

The ARaaS 160 can provide a call into a unified regulation service (URS) 410, which can be a model of domestic and international taxes. The URS 410 can be created, at a time of onboarding an actual corresponding governmental and regulatory entities and their extensive rules. The URS 410 can, for example, model the requirements and the rules of domestic taxes, international tariffs, and various associated codes. The URS 410 can access domestic service 416 and international service 422, which can provide further specialized functionality that has been modeled on laws and regulations of certain jurisdictions. For example, the domestic service 416 can include models of USA and certain state taxes. The international service 422 can include models of various tariffs and their requirements. The ARaaS 160 can provide calls into the import service 412 that can model the regulation services of hundreds of countries. The import service 412 can access a model of licensing 420 that can be used to generate licenses for importing certain products. The licensing 420 can generate the required license, which can be submitted to an external agency (such as via another access point) to satisfy requirements of the transaction. The regulation 418, the domestic service 416, and/or the international service can access the regulation repository 430. The regulation repository 430 can be implemented using one or more databases, and can store updated rules and regulations such as jurisdictional tariffs (e.g., US tariff, EU tariff, ATAM tariff, APAC tariff, Harmonized Tariff Schedule (HTS), among others).

Figure 5:
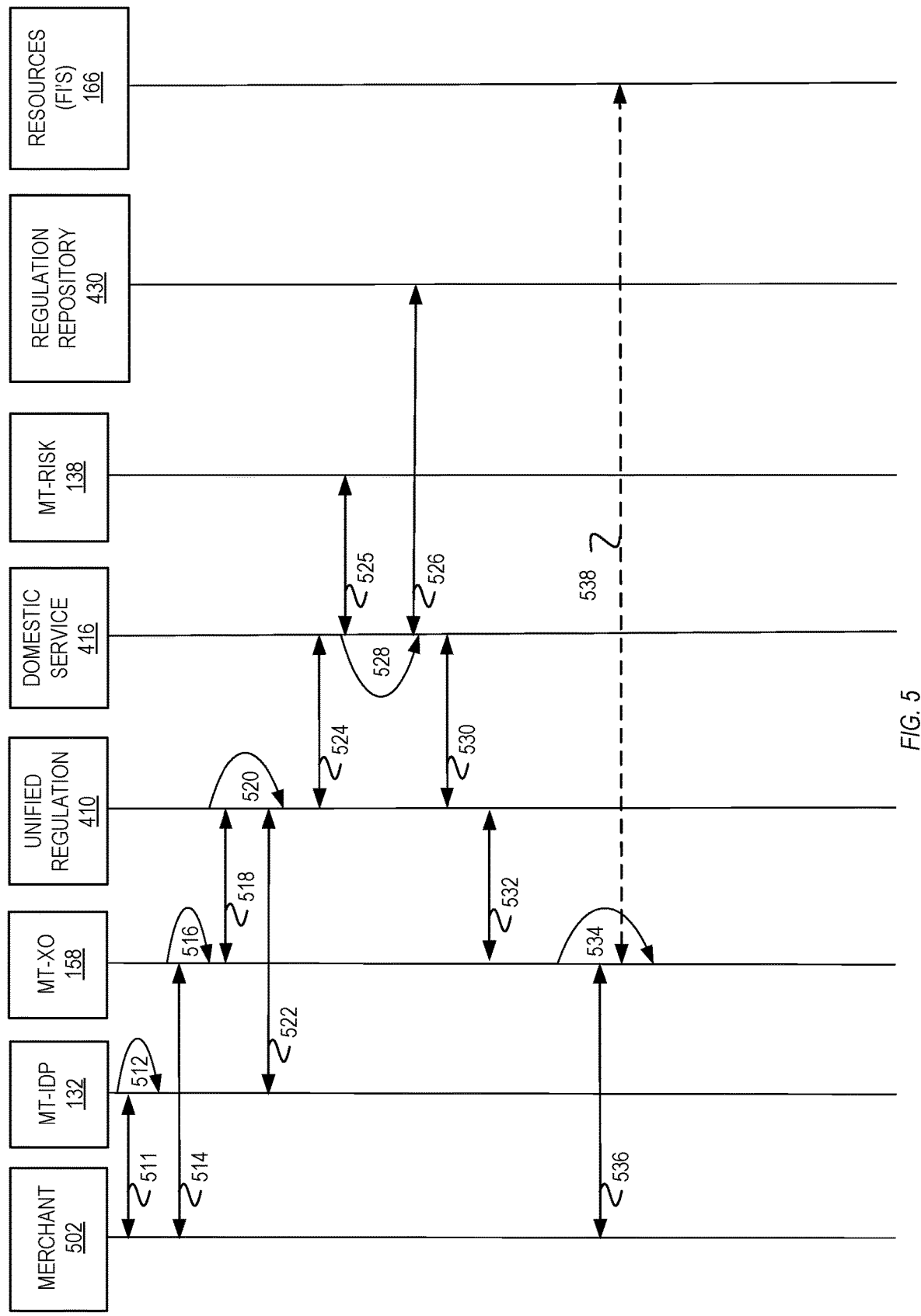
FIG. 5 is a timing diagram illustrating embodiments of flow of operations of using the ARaaS multi-tenant service for transaction processing.

FIG. 5 is a diagram illustrating embodiments of flow of operations of using the multi-tenant marketplace architecture. FIG. 5 illustrates an example logical flow of operations between various entities of the multi-tenant platform 102 that uses the ARaaS 160. FIG. 5 illustrates communication between a merchant 502 (which can be an actual merchant that is also represented in the multi-tenant platform 102), the MT-IDP 132, the MT-XO 158, the unified regulation 410, the domestic service 416, the MT-Risk 138, the regulation repository 430, and resources 166.

At 511, the merchant 502 can access the MT-IDP 132, such as an external caller entity to the multi-tenant platform 102. At 512, the MT-IDP 132 can determine an internal merchant representation (e.g., as the LW merchant 334(1) in the hierarchical data structure 244) of the merchant 502. At 511, the MT-IDP 132 can further return an access token to the merchant 502 for access to the MT-XO 158 for checkout functionality. At 514, the merchant 502 can access the MT-XO with the access token to initiate a transaction with a certain customer. At 515, the MT-XO can communicate with the MT-IDP 132 to validate the tenant in the hierarchical data structure as a merchant representation, e.g., as a LW merchant 334(1) representation. At 520, the MT-XO 158 can access the unified regulation 410 using the merchant representation. At 522, the unified regulation can access the MT-IDP 132 to obtain onboarded buyer information (e.g., the customer representation as related to the transaction).

At 524, the unified regulation 410 can access, using the merchant representation and the customer representation the domestic regulation 416, such as to determine certain taxes for the transaction. At 525, the domestic regulation 416 can access, using the merchant and/or customer representations, MT-Risk 138 to determine risk. At 526, the domestic regulation 416 can access the regulation repository 430 to determine certain rules that may be accessed externally. At 528, the domestic service can determine an amount that is owed, based on information from the regulation repository and on the risk. At 530 and 532, any tax data is returned to the MT-XO 158. At 534, the MT-XO can initiate, via the merchant representations, a payout transaction (of 538), and also finalize the initial transaction with the merchant at 536.

Figure 6:
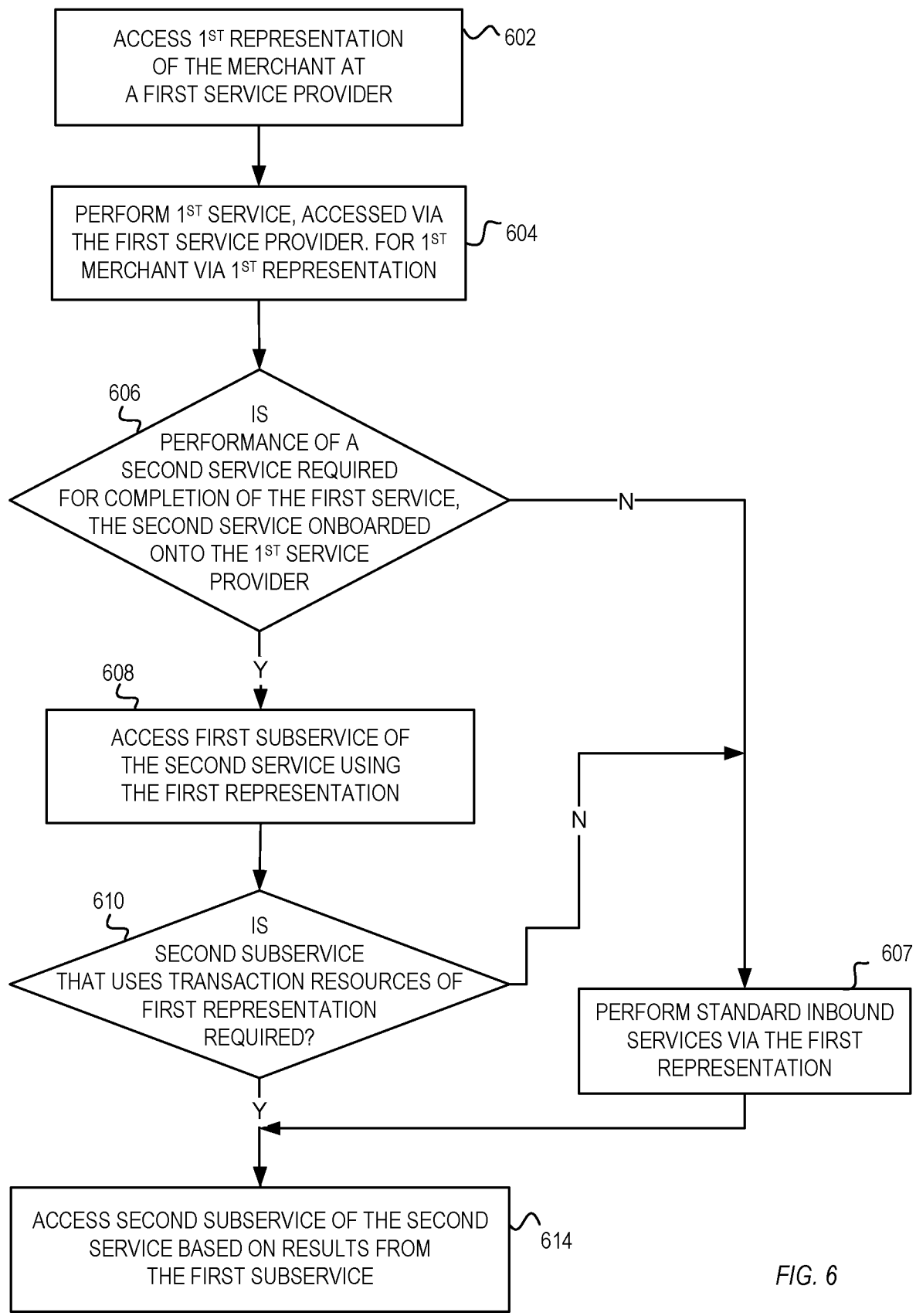
FIG. 6 is a diagram illustrating embodiments of flow of operations of using the ARaaS multi-tenant service for transaction processing.

FIG. 6 is a diagram illustrating embodiments of flow of operations of using the ARaaS multi-tenant service for transaction processing. The method of FIG. 6 is described with reference to the systems and components described in FIGS. 1-5 (for illustration purposes and not as a limitation). The example operations can be carried out by the transaction processor that uses the multi-tenant platform 102.

At 602, the multi-tenant platform 102 accesses a representation of the merchant. The multi-tenant platform 102 can access the representation (which can be a lightweight merchant representation) at an identity manager (e.g., as implemented by the identity services 132). The identity manager can implement the representation using a first hierarchical data structure (or by another representation of the model of the service provider 108 in the identity services 132). In cases where the service provider 108 is not yet onboarded onto the multi-tenant platform 102, the service provider 108 can be onboarded onto the identity services 132.

At 604, the multi-tenant platform can perform a first service for the first merchant using the first representation. With reference to the above examples, the multi-tenant platform can perform a checkout transaction, such as by accessing the MT-XO 158 using the merchant representation. One example is discussed above at 516 and 518.

At 606, the multi-tenant platform can determine whether performance of a second service is required for completion of the first service. With continued reference to the example above, the multi-tenant platform can determine that the ARaaS 160 service is required for completion of the checkout transaction. In some cases, the ARaaS 160 can be called directly with the initial transaction, such as where the merchant determines to explicitly call ARaaS 160. In some cases, the multi-tenant platform can determine, such as based on the policies 136, that ARaaS 160 is needed. If performance of a second service is required, flow continues at 610, otherwise the flow continues to 607. At 607, the multi-tenant platform can simply finish the transaction, as services of ARaaS 160 are not needed.

At 608, the multi-tenant platform can perform a first subservice of the second service using the first representation. With continued reference to the example above, the multi-tenant platform 102 can perform a first subservice such as a call (at 522) to the unified regulation service 410 using the merchant representation.

At 610, the multi-tenant platform can determine whether a second subservice that uses transaction resources of the first representation is required. For the above example, the second subservice may be the payout transaction at 538 that uses the results of the determination at 608. At 614, the multi-tenant platform can access a second subservice of the second service based on results from the first subservice. With continued reference to the example above, the multi-tenant platform 102 can perform a second subservice, via the merchant representation, such as the payout transaction at 538 that uses the results of the determination at 608.

FIG. 6 illustrates one of many use cases of the ARaaS 160 that uses a checkout service MT-XO 158 for a certain transaction and/or certain merchants. As discussed, the functionality of ARaaS 160 can be accessed without any particular transactions. For example, the ARaaS 160 can be called directly by certain tenants and/or merchants to determine outcomes such as calculation of tariffs for import/export functionalities. Functionality of the ARaaS 160 can also be triggered for other services of the multi-tenant platform 102.

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 5 and 6 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 7:
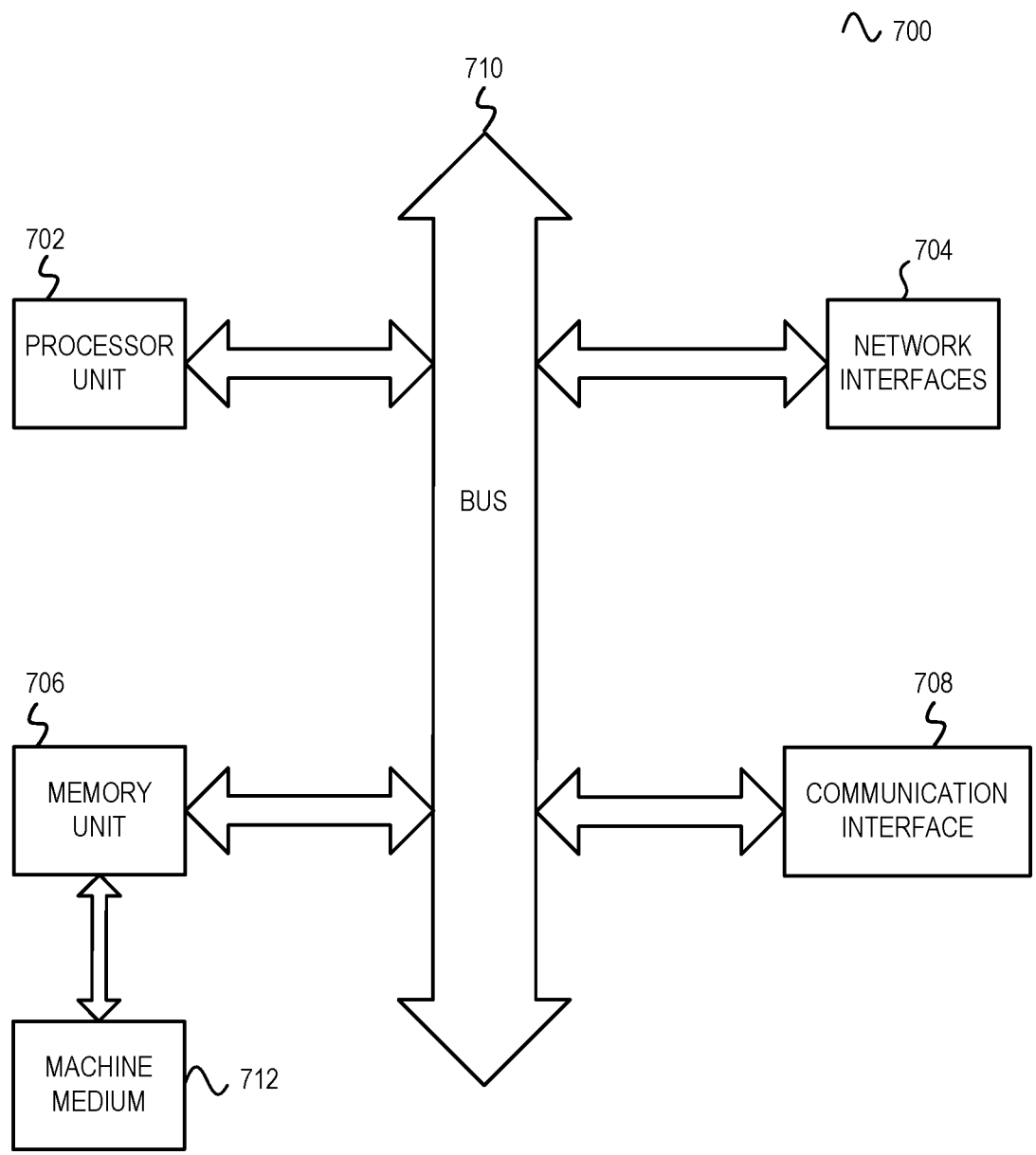
FIG. 7 is a block diagram illustrating embodiments of electronic devices used in the communication systems of FIGS. 1-6.

FIG. 7 is a block diagram of one embodiment of an electronic device 700 used in the communication systems of FIGS. 1-6. In some implementations, the electronic device 700 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 700 can include a processor unit 702 (possibly including multiple processors, multiple cores, multiple nodes, and/or implementing multi-threading, etc.). The electronic device 700 can also include memory unit 706 and a machine medium 712 coupled to the memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 700 can also include a bus 710 (e.g., PCI, ISA, PCI-Express, HyperTransport®, InfiniBand®, NuBus, AHB, AXI, etc.), and network interfaces 704 can include wire-based interfaces (e.g., an Ethernet interface, a powerline communication interface, etc.). The electronic device 700 includes a communication interface 708 for network communications. The communication interface 708 can include at least one of a wireless network interface (e.g., a WLAN interface, a Bluetooth interface, a WiMAX interface, a ZigBee interface, a Wireless USB interface, etc.). In some implementations, the electronic device 700 may support multiple network interfaces—each of which is configured to couple the electronic device 700 to a different communication network.

The memory unit 706 can embody functionality to implement embodiments described in FIGS. 1-6 above. In one embodiment, the memory unit 706 can include one or more of functionalities for using agency and regulation modeling for transactions in multi-tenant architecture systems. Any one of these functionalities may be partially (or entirely) implemented in hardware and/or on the processor unit 702. For example, some functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, memory unit 706, the network interfaces 704, and the communication interface 708 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the present disclosure is not limited to them. In general, techniques for agency and regulation modeling for transactions in multi-tenant architecture systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for applying agency and regulation modeling to transactions in a multi-tenant architecture system, the method comprising:
   accessing a first representation of a first merchant in an identity manager hosted by a first service provider, the identity manager managing representation identity of the first merchant, the first merchant being managed via a full representation by an original identity manager hosted by a merchant service provider;
   performing a first service for the first merchant via the first representation, the first service accessible as a core service of the first service provider;
   determining, based on first results of the performance of the first service and on policies of the first service provider, that performance of a second service is required for a completion of the first service, the second service being provided by a second service provider that is onboarded into the first service provider, the second service amending one or more requirements for the policies of the first service provider; and
   accessing a first subservice of the second service using the first representation to generate second results for use at a second subservice of the second service, the second subservice configured to use transaction resources associated with the first representation.

2. The method of claim 1, further comprising:
   determining to transfer resources using an access point to an external entity via a model of resources of a third service provider, wherein the second subservice is configured to call the core service during onboarding of a third service onto the third service provider.

3. The method of claim 1, further comprising:
   onboarding the second service onto the first service provider to provide accessibility, via the first representation calling via the first service provider, to the first subservice and to the second subservice.

4. The method of claim 1, further comprising:
updating the policies of the first service provider to indicate service requirements of the second service provider.

5. The method of claim 1, wherein
the second service is onboarded to model behavior of a regulatory entity, the modeled behavior accessible via the first service provider by an external entity via a representation of the external entity at the first service provider.

6. The method of claim 1, further comprising:
selecting a third service provided via a third service provider that is accessible via the first service provider; and
determining that performance of the second service is required for a completion of the third service.

7. The method of claim 1, further comprising:
determining that the first merchant comprises a second representation having an own internal data structure for providing transaction services to users; and
providing additional linking between the second and first representations.

8. The method of claim 1, further comprising:
generating a resource request for providing a first amount of transaction resources for a first transaction service to a resource of the first merchant via the first representation.

9. The method of claim 1, wherein
the first subservice comprises generating a license that is provided to an external agency via an access point associated with an onboarded second representation; and
the second subservice accesses another access point associated with the onboarded second representation.

10. A system comprising:
a non-transitory memory storing instructions; and
a processor configured to execute the instructions to cause the system to:
access a first representation of a first merchant in a first hierarchical data structure, the first hierarchical data structure being managed by a first service provider, the first service provider managing entity identity of the first merchant, the first merchant being managed via a full representation in an original hierarchical data structure by a marketplace service provider;
access the marketplace service provider to initiate a first service for the first merchant;
determine, prior to completion of the first service and on policies of the first service provider, that performance of a second service is required for a completion of the first service, the second service being provided by a second service provider that is onboarded into the first service provider, the second service amending one or more requirements for the policies of the first service provider; and
access a first subservice of the second service using the first representation to generate second results for use at a second subservice of the second service, the second subservice configured to use transaction resources associated with the first representation.

11. The system of claim 10, wherein executing the instructions further cause the system to,
determine to transfer resources using an access point to an external entity via model of resources of a third service provider, wherein the second subservice is configured to call a core service of a first service provider during onboarding of a third service onto the third service provider.

12. The system of claim 10, wherein executing the instructions further cause the system to,
onboard the second service onto the first service provider to provide accessibility, via the first representation calling via the first service provider, to the first subservice and to the second subservice.

13. The system of claim 10, wherein executing the instructions further cause the system to,
update the policies of the first service provider to indicate service requirements of the second service provider.

14. The system of claim 10, wherein
the second service is onboarded to model behavior of a regulatory entity, the modeled behavior accessible via the first service provider by an external entity via a representation of the external entity at the first service provider.

15. The system of claim 10, wherein
the first subservice comprises generating a license that is provided to an external agency via an access point associated with an onboarded second representation; and
the second subservice accesses another access point associated with the onboarded second representation.

16. A non-transitory machine-readable medium having instructions stored thereon, the instructions executable to cause performance of operations comprising:
accessing a first representation of a first merchant in a first hierarchical data structure, the first hierarchical data structure being managed by a first service provider, the first service provider managing entity identity of the first merchant, the first merchant being managed via a full representation in an original hierarchical data structure by a merchant service provider;
performing a first service for the first merchant via the first representation, the first service accessible as a core service of the first service provider;
determining, based on first results of the performance of the first service and on policies of the first service provider, that performance of a second service is required for a completion of the first service, the second service being provided by a second service provider that is onboarded into the first service provider, the second service amending one or more requirements for the policies of the first service provider; and
accessing a first subservice of the second service using the first representation to generate second results for use at a second subservice of the second service, the second subservice configured to use transaction resources associated with the first representation.

17. The non-transitory machine-readable medium of claim 16, wherein the operations further comprise:
determining to transfer resources using an access point to an external entity via a model of resources of a third service provider, wherein the second subservice is configured to call the core service during onboarding of a third service onto the third service provider.

18. The non-transitory machine-readable medium of claim 16, wherein the operations further comprise:
onboarding the second service onto the first service provider to provide accessibility, via the first representation calling via the first service provider, to the first subservice and to the second subservice.

19. The non-transitory machine-readable medium of claim 16, wherein the operations further comprise:
  updating the policies of the first service provider to indicate service requirements of the second service provider.

20. The non-transitory machine-readable medium of claim 16, wherein
  the second service is onboarded to model behavior of a regulatory entity, the modeled behavior accessible via the first service provider by an external entity via a representation of the external entity at the first service provider.

\* \* \* \* \*